March 27, 1945.  A. J. LOEPSINGER  2,372,214
SWAY BRACE
Filed Sept. 30, 1943
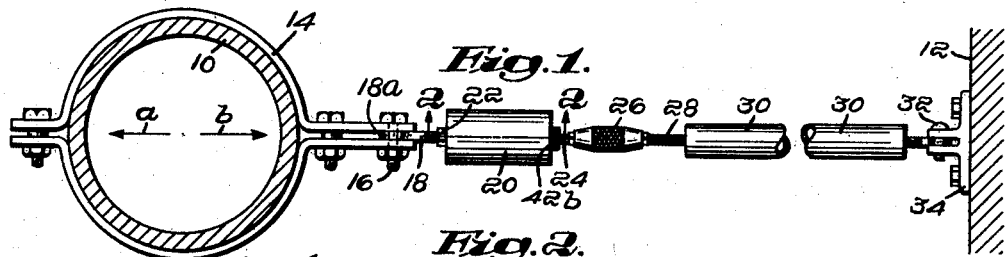
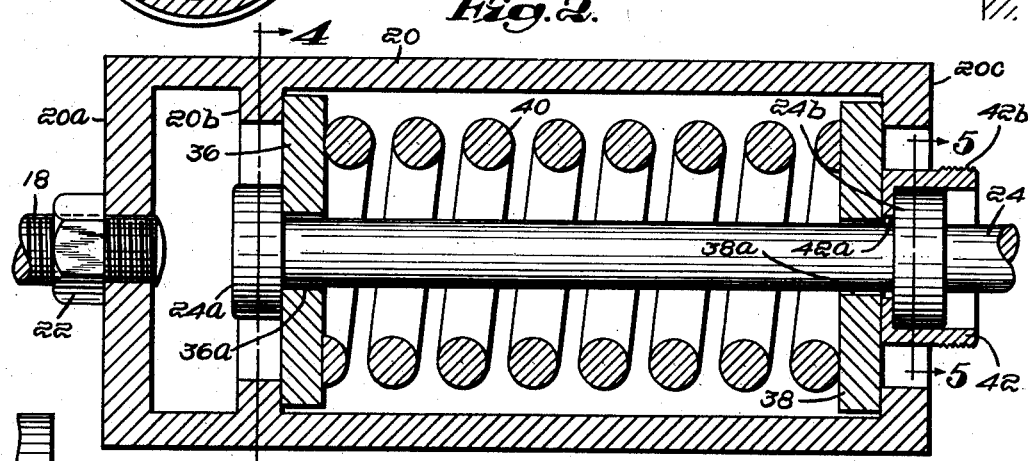
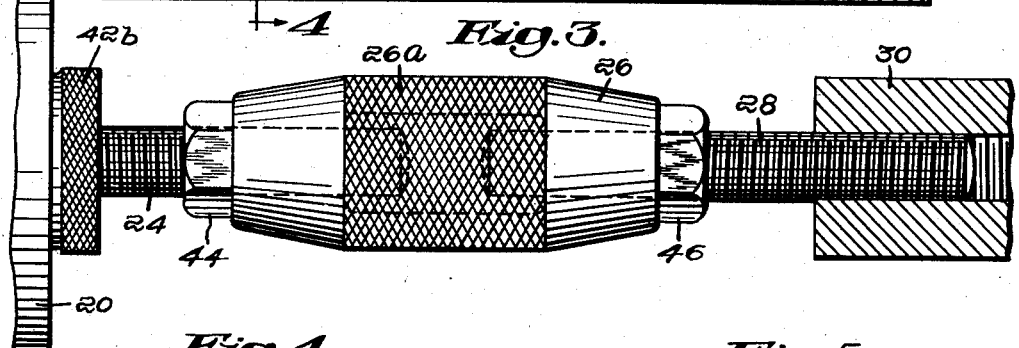
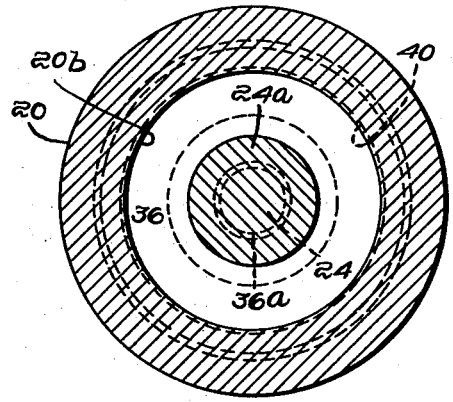
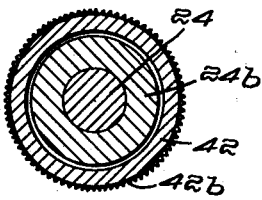
Albert J. Loepsinger,
Inventor:
by Harry Dexter Peck
Attorney Patented Mar. 27, 1945

2,372,214

UNITED STATES PATENT OFFICE 2,372,214

SWAY BRACE

Albert J. Loepsinger, Providence, R. I., assignor to Grinnell Corporation, Providence, R. I., a corporation of Delaware Application September 30, 1943, Serial No. 504,507

5 Claims. (Cl. 248—59)

This invention relates to improvements in sway braces.

The object of this invention is to provide a simple, easily adjustable brace for an element which may be subjected to influences tending to move it from its normal position. In the case of a pipe, shown herein as illustrative of such an element, it may be subjected to a vibrational influence which, if unresisted, may cause the pipe to sway to a dangerous degree. Also piping on a ship may be so supported that when the ship rolls or pitches the weight of the pipe itself may tend to cause its displacement with respect to its normal position. Usually such tendency to move occurs in opposite directions and it is desirable to provide a brace which can resist such opposite tendencies.

It is also important to provide for the proper adjustment of a brace so that the brace itself will impose no strain on the pipe when the latter is in its normal or usual position. It is a feature of my improved brace that such an adjustment can be made manually without the aid of tools and the nicety of the adjustment readily determined.

The best mode in which I have contemplated applying the principles of my invention is shown in the accompanying drawing but these are to be taken as merely illustrative for it is intended that the patent shall cover by suitable expression in the appended claims whatever features of patentable novelty exist in the invention disclosed.

In the drawing:

Figure 1 is an illustrative showing of my improved brace as it may be applied between a fixed wall and a pipe;

Figure 2 is a section taken as on line 2—2 of Figure 1;

Figure 3 is an enlarged view of the manual adjusting means;

Figure 4 is a section as on line 4—4 of Figure 2; and

Figure 5 is another section as on line 5—5 of Figure 2.

Referring to the drawing and especially to Figure 1, the pipe 10 is representative of an element normally at rest in a predetermined position but subject to influences which may tend to cause it to move or sway. As here shown it is assumed for purposes of illustration that the pipe 10 may tend to move in the directions of the arrows a and b. A wall 12 may be assumed to represent a fixed support with reference to the pipe 10. Under such assumed conditions my improved brace could be installed as shown in Figure 1.

A clamp 14 is attached to the pipe and carries a bolt 16 which passes through a loop end 18a of a rod 18 whose other end is attached to a casing 20, as by being threaded therein and secured by a lock nut 22. Thus the casing is in effect secured to the pipe and must move with the pipe whenever the latter sways in the directions of the arrows a and b. The pivotal connection provided by the bolt 16 and the loop end of the rod 18 permits longitudinal contraction on elongation of the pipe which may occur if the fluid in the pipe is subject to varying temperatures.

From within the casing 20 a rod 24 extends to what I shall call a turnbuckle 26, although it is purposely designed somewhat differently from the ordinary open turnbuckle. Another rod 28 extends from the turnbuckle into a tubular element 30 having pivotal connection at 32 with a suitable bracket 34 secured to the wall 12. Thus in effect, the rod 24 may be deemed anchored to the wall and immovable in the directions of the arrows a and b. The pivotal connection at 32 coacts with the one between the bolt 16 and the loop end 18a to permit the longitudinal or axial movement of the pipe hereinbefore mentioned.

Turning now to Figure 2, the casing 20 is provided with a head 20a to which the rod 18 is attached. Spaced from the head is an internal annular flange 20b constituting a seat for a washer 36 having a hole 36a at its center through which the rod 24 is movable. At the end of the casing 20 opposite the head 20a is another internal annular flange 20c constituting another seat for a second washer 38 which also has a central hole 38a through which the rod 24 is movable. Between the washers 36 and 38 is a coiled spring 40 which may be of any strength desired and which may be preloaded when normally positioned between the washers as shown in Figure 2. The inner end of the rod 24 is secured to a collar or head 24a which rests against the washer 36 on the side opposite the spring 40. Outside of the washer 38 is another collar 24b secured to the rod 24.

Surrounding this collar is a feeler sleeve 42 having an inturned annular flange 42a which extends between the washer 38 and the collar 24b. At its outer end the sleeve has a knurled external surface 42b. When the two washers 36 and 38 are held against the flanges 20b and 20c respectively of the casing 20, and with the collar or head 24a of the rod 24 resting against the washer 36 but imposing no appreciable force thereon, the collar 24b should be sufficiently spaced from the washer 38 to permit the feeler sleeve 42 to be rotated by hand without any undue looseness. If there is undue looseness, it indicates that rod 24 is exerting a pull on the washer 36 which is transmitted through the spring 40, washer 38, flange 20c, casing 20, rod 18 and clamp 16 to the pipe 10. Conversely if the feeler sleeve 42 can not be turned at all but is held tightly between the collar 24b and the washer 38, it indicates that the rod 24 is exerting a push on the flange 42a and washer 38 which is transmitted by the spring 40, washer 36, flange 20b, casing 20, rod 18 and clamp 16 to the pipe 10. Thus when the pipe 10 is in its normal or predetermined position, the degree of looseness of the feeler sleeve 42 will indicate whether or not the brace as a whole is imposing a pull or a push on the pipe.

Obviously if the purpose of the brace is to resist the tendency of some force to sway the pipe from its normal position, it is important that the brace itself be capable of rather nice adjustment so that it will not exert any force on the pipe when then is no tendency for the pipe to sway. This adjustment is provided by the turnbuckle 26 best seen in Figure 3. The rod 24 is screwed into the turnbuckle by means of left hand threads, whereas rod 28 is screwed into the turnbuckle by means of right hand threads or vice versa. Thus by turning the turnbuckle, the two rods 24 and 28 can be brought closer to one another or separated. The turnbuckle is purposely made with a solid barrel having a knurled surface 26a whereby it can be turned easily by hand. Thus the brace can be nicely adjusted, as indicated by the looseness of the feeler sleeve 42, and then held in proper adjustment by the lock nuts 44 and 46. When so adjusted it should impose no force on the pipe 10 when the latter is in its normal or predetermined position.

If the pipe tends to sway in the direction of the arrow a, the casing 20 and washer 38 tend to move in the same direction. This imposes a force on the adjacent end of spring 40. But the opposite end of the spring can not move because washer 36 is against the head 24a of rod 24 and, as hereinbefore described, the latter is anchored to the fixed support 12. As a result the spring 40 will be compressed and exert a force counter to that causing the pipe to sway. This will not only reduce the extent of the sway but as soon as the force causing the sway is removed, the spring will assist in bringing the pipe back to its normal or predetermined position.

Conversely, when the sway is in the direction of arrow b, the casing 20 and washer 36 are pushed to the right. But the other end of the spring can not be moved because washer 38, via the flange 42a of the feeler sleeve, is held immovable by the collar 24b on rod 24. Hence the spring is compressed, resisting the force causing the sway. When this latter force disappears the spring will assist in restoring the pipe to its normal or predetermined position.

I have thus provided a simple sway brace, requiring only one spring to reduce and overcome sways in opposite directions and providing for nicety of manual adjustment to insure against the brace itself imposing any undesired stress on the pipe.

I claim:

1. A sway brace comprising a member having separated seats, movable elements arranged to rest on said seats, resilient means interposed between said elements, and another member extending through said resilient means and said elements having means for engaging the said elements on the sides thereof opposite said resilient means; the said resilient means being adapted to oppose relative movement between said members in either direction.

2. A sway brace comprising a casing having separated seats, movable elements arranged to rest on said seats, a spring interposed between said elements, and a rod extending through said spring and said elements having means for engaging each element on the side thereof opposite said spring; the said spring being adapted to oppose relative movement between the casing and the rod in either direction.

3. A sway brace comprising a casing having separated seats, a movable element adjacent each of said seats on the side thereof toward the other seat, a spring interposed between said elements, and a rod extending through said elements and said spring having shoulders for engaging the said elements on the sides thereof opposite said spring; the said spring being adapted to oppose relative movement between the casing and the rod in both directions.

4. A sway brace comprising a casing having separated seats; a movable plate adapted to rest on each said seat; a spring interposed between said plates normally holding them against their respective seats; and a rod extending through said plates and within said spring; means on the rod for engaging one of said plates on its side opposite to said spring; and other means on the rod spaced from the other of said plates on the side thereof opposite to said spring; a feeler element interposed between the last said means and adjacent plate; and external means for adjusting the position of said rod relative to said casing; the correct adjustment being indicated by the degree of looseness of said feeler element.

5. A sway brace comprising a casing having separated seats; a movable plate adapted to rest on each said seat; a spring interposed between said plates normally holding them against their respective seats; and a rod extending through said plates and within said spring having spaced apart means for engaging each said plate on the side thereof opposite said spring; the said spring opposing relative movement between the casing and rod in either direction.

ALBERT J. LOEPSINGER.